US012803104B2

(12) United States Patent
Zhu et al.

(10) Patent No.: US 12,803,104 B2
(45) Date of Patent: Nov. 17, 2026

(54) BATTERY ARRAY THERMAL BARRIER WITH DEFLECTOR HOODS

(71) Applicant: Ford Global Technologies, LLC, Dearborn, MI (US)

(72) Inventors: Di Zhu, Novi, MI (US); Patrick Roxin, Livonia, MI (US); Mohammadreza Eftekhari, Novi, MI (US); Timothy Andrew Strand, Plymouth, MI (US); Chris David Tiernan, Commerce Township, MI (US); Bhaskara Rao Boddakayala, Troy, MI (US); Giriraj Srinivasan, Troy, MI (US); Sara Buchel, Fenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 579 days.

(21) Appl. No.: 18/451,376

(22) Filed: Aug. 17, 2023

(65) Prior Publication Data

US 2025/0062482 A1 Feb. 20, 2025

(51) Int. Cl.
*H01M 50/342* (2021.01)
*H01M 10/658* (2014.01)

(52) U.S. Cl.
CPC ..... *H01M 50/3425* (2021.01); *H01M 10/658* (2015.04); *H01M 2220/20* (2013.01)

(58) Field of Classification Search
CPC ... B60L 50/66; H01M 10/613; H01M 10/658; H01M 50/204; H01M 50/209; H01M 50/244; H01M 50/249; H01M 50/3425; H01M 50/358; H01M 50/367; H01M 2220/20; Y02E 60/10
See application file for complete search history.

(56) References Cited

U.S. PATENT DOCUMENTS

| | | | | |
|---|---|---|---|---|
| 5,114,807 A | 5/1992 | Rowlette | | |
| 6,228,518 B1 | 5/2001 | Kindler | | |
| 10,008,704 B2 | 6/2018 | Sweney et al. | | |
| 10,559,797 B2 | 2/2020 | Sweney et al. | | |
| 11,296,381 B2 | 4/2022 | Miler et al. | | |
| 2013/0095356 A1* | 4/2013 | Shimizu | H01M 50/519 | 429/88 |
| 2015/0194641 A1* | 7/2015 | Tsuji | H01M 10/658 | 429/156 |
| 2016/0254578 A1* | 9/2016 | Liu | H01M 50/289 | 429/120 |
| 2018/0138478 A1* | 5/2018 | Chan | H01M 50/271 | |
| 2021/0143448 A1 | 5/2021 | Blackburn et al. | | |

(Continued)

FOREIGN PATENT DOCUMENTS

| | | |
|---|---|---|
| IN | 337680 B | 11/2019 |
| JP | 2022553873 A | 12/2022 |

(Continued)

*Primary Examiner* — Daniel S Gatewood
(74) *Attorney, Agent, or Firm* — David B. Kelley; Carlson, Gaskey & Olds, P.C.

(57) ABSTRACT

A battery pack assembly includes a cell stack having a plurality of battery cells, a thermal barrier adjacent the cell stack, and deflector hoods included within the thermal barrier. Each deflector hood configured to move from a closed position to an open position in response to a flow of vent byproducts against the deflector hood.

19 Claims, 4 Drawing Sheets

(56) References Cited

U.S. PATENT DOCUMENTS

| | | | | |
|---|---|---|---|---|
| 2021/0151830 | A1 | 5/2021 | Shayan et al. | |
| 2021/0408575 | A1 | 12/2021 | Lampe-Onnerud et al. | |
| 2022/0271349 | A1 | 8/2022 | Cunningham-Brown et al. | |
| 2022/0271369 | A1 | 8/2022 | Pitre et al. | |
| 2022/0328918 | A1 | 10/2022 | Pitre et al. | |
| 2022/0416359 | A1* | 12/2022 | Feltham | H01M 50/213 |
| 2023/0017153 | A1 | 1/2023 | Shaffer, II et al. | |
| 2023/0198088 | A1 | 6/2023 | Yadav et al. | |
| 2023/0268613 | A1* | 8/2023 | Kullberg | H01M 50/383 429/163 |

FOREIGN PATENT DOCUMENTS

| | | | | |
|---|---|---|---|---|
| JP | 2023507588 | A | 2/2023 | |
| WO | WO-2022008080 | A1 * | 1/2022 | H01M 50/213 |
| WO | 2023279090 | A4 | 1/2023 | |
| WO | 2023279096 | A2 | 1/2023 | |

* cited by examiner

BATTERY ARRAY THERMAL BARRIER WITH DEFLECTOR HOODS

TECHNICAL FIELD

This disclosure relates generally to a thermal barrier that can direct vent byproducts from a battery cell within a battery array of a battery pack.

BACKGROUND

A battery pack of an electrified vehicle can include groups of battery cells arranged in one or more battery arrays. From time to time, pressure within one the battery cells can increase and then be released through a vent in that battery cell.

SUMMARY

In some aspects, the techniques described herein relate to a battery pack assembly, including: a cell stack having a plurality of battery cells; a thermal barrier adjacent the cell stack; and a plurality of deflector hoods included within the thermal barrier, each deflector hood configured to move from a closed position to an open position in response to a flow of vent byproducts against the deflector hood.

In some aspects, the techniques described herein relate to a battery pack assembly, each deflector hood having a underside facing the plurality of battery cells, the flow of vent byproducts contacting the underside to move the deflector hood from the closed position to the open position.

In some aspects, the techniques described herein relate to a battery pack assembly, wherein the deflector hood in the closed position covers an aperture in the thermal barrier, and the deflector hood in the open position permits some flow through the aperture while partially covering the aperture such that flow of the vent byproducts through the opening contacts an underside of the deflector hood and is redirected from flowing in a first direction to flowing in a second direction different than the first direction.

In some aspects, the techniques described herein relate to a battery pack assembly. wherein the open position is a fully-open position.

In some aspects, the techniques described herein relate to a battery pack assembly, wherein the thermal barrier includes a plurality of scored regions, each scored region establishing one of the deflector hoods within the plurality of deflector hoods.

In some aspects, the techniques described herein relate to a battery pack assembly, wherein each scored region within the plurality of scored regions is arc-shaped.

In some aspects, the techniques described herein relate to a battery pack assembly, wherein the thermal barrier includes a plurality of cuts, each cut establishing one of the deflector hoods within the plurality of deflector hoods.

In some aspects, the techniques described herein relate to a battery pack assembly, wherein each cut within the plurality of cuts has a C-shaped profile.

In some aspects, the techniques described herein relate to a battery pack assembly, wherein each deflector hood within the plurality of deflector hoods is hood-shaped.

In some aspects, the techniques described herein relate to a battery pack assembly, wherein the thermal barrier is mica-based.

In some aspects, the techniques described herein relate to a battery pack assembly, wherein the plurality of battery cells are disposed along a cell stack axis, wherein the thermal barrier is adjacent an outboard side of the cell stack, the deflector hood configured to guide flow moving away from the cell stack axis to move along the cell stack axis.

In some aspects, the techniques described herein relate to a battery pack assembly, wherein the thermal barrier secured adjacent to the cell stack using a plurality of push-pins.

In some aspects, the techniques described herein relate to a battery pack assembly, wherein the thermal barrier is secured adjacent to an endplate of the cell stack.

In some aspects, the techniques described herein relate to a method of venting a battery cell, including; positioning a thermal barrier adjacent a plurality of battery cells, the thermal barrier having a plurality of deflector hoods; moving at least one of the deflector hoods within the plurality of deflector hoods from a closed position to an open position in response to a flow of vent byproducts against the deflector hood; and redirecting the flow of vent byproducts using the at least one of the deflector hoods.

In some aspects, the techniques described herein relate to a method, further including scoring the thermal barrier to establish the plurality of deflector hoods.

In some aspects, the techniques described herein relate to a method, further including scoring the thermal barrier by slicing the thermal barrier.

In some aspects, the techniques described herein relate to a method, wherein the deflector hoods are "C" shaped.

In some aspects, the techniques described herein relate to a method, wherein the at least one of the deflector hoods is in a fully-open position during the redirecting.

In some aspects, the techniques described herein relate to a method, wherein the plurality of battery cells are disposed along a cell stack axis, wherein the redirecting includes redirecting the flow of vent byproducts from moving outward away from the plurality of battery cells to move along the cell stack axis.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A typical traction battery pack includes an enclosure having an interior. Arrays of battery cells are held in the interior along with other components. A thermal event in one or more of the battery cells within of an array can cascade to other battery cells in the battery pack, including battery cells in other battery arrays.

This disclosure details an exemplary thermal barrier that helps to thermally insulate a battery array. The thermal barrier can, when required, providing help to direct vent byproducts from a venting battery cell to an area outside a battery pack and away from battery cells that are not venting.

Figure 1:
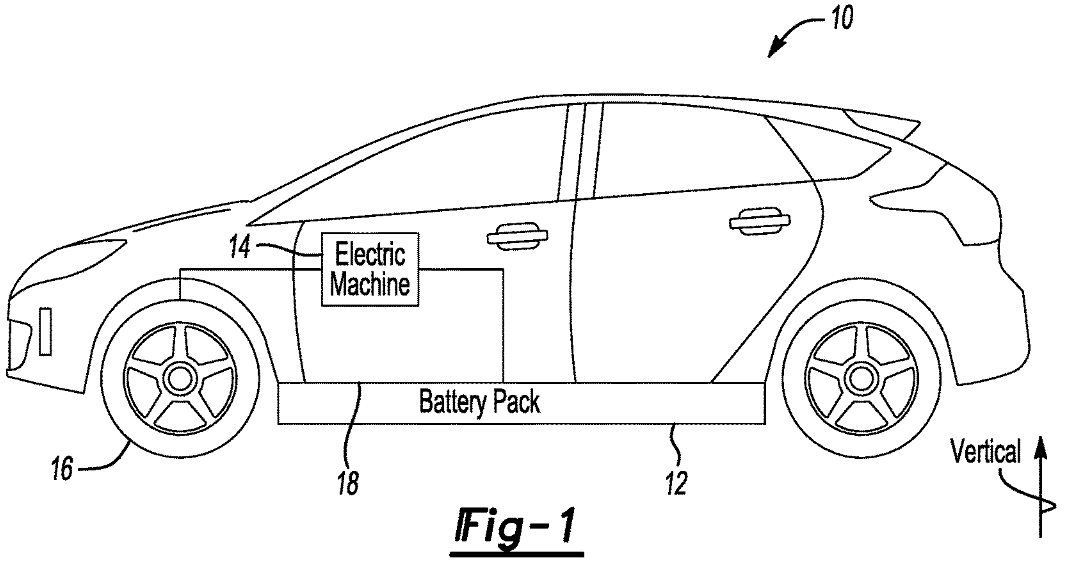
FIG. 1 illustrates a side view of an electrified vehicle having a battery pack.

With reference to FIG. 1, an electrified vehicle 10 includes a traction battery pack 12, an electric machine 14, and wheels 16. The battery pack 12 powers the electric machine 14, which converts electric power to torque to drive the wheels 16. The battery pack 12 can be a relatively high-voltage battery.

The battery pack 12 is, in the exemplary embodiment, secured to an underbody 18 of the electrified vehicle 10. The battery pack 12 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead, or in addition to, an electric machine. Generally, the electrified vehicle 10 could be any type of vehicle having a traction battery pack.

Figure 2:
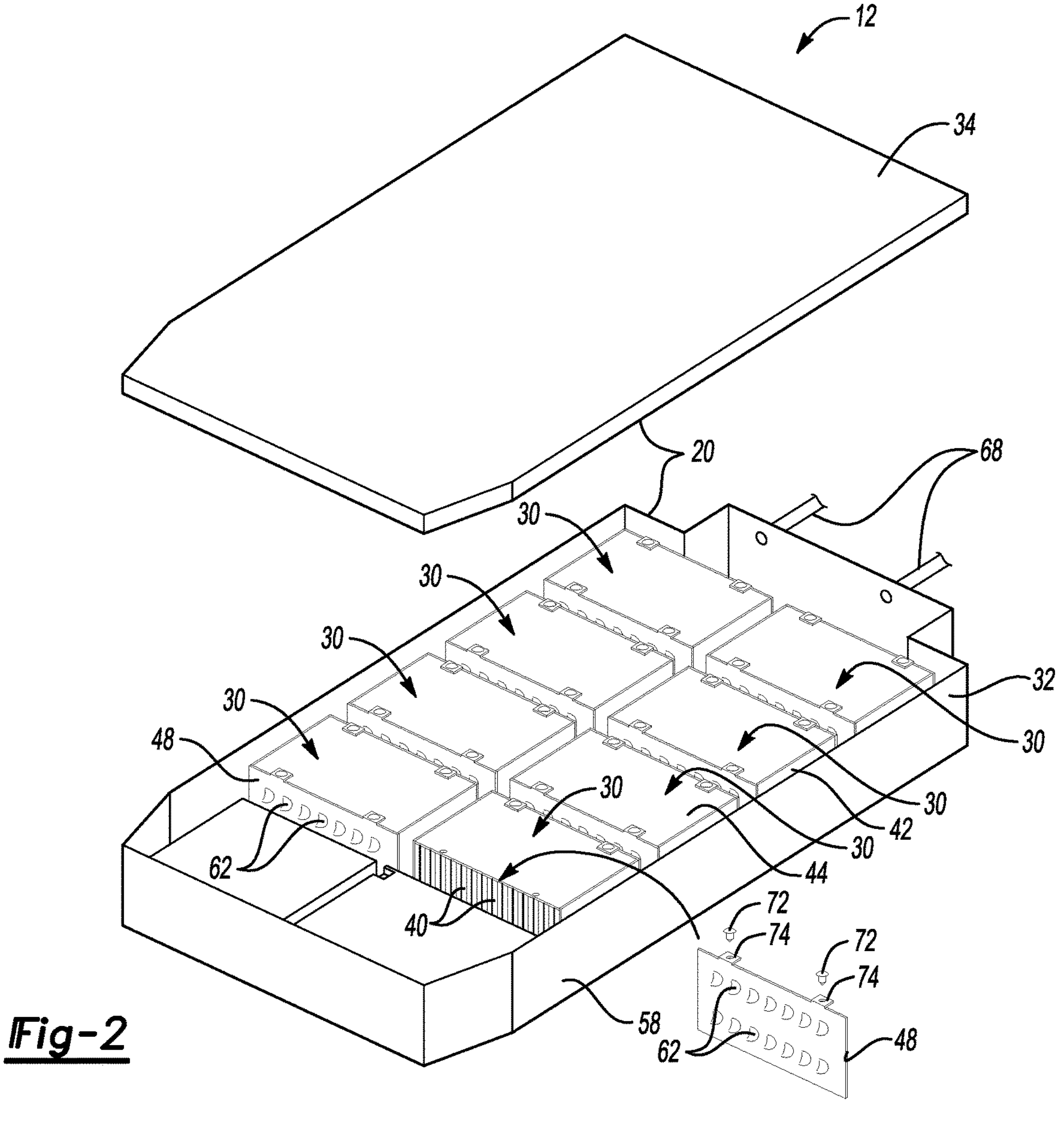
FIG. 2 illustrates a partially expanded view of the battery pack from FIG. 1.
Figure 3:
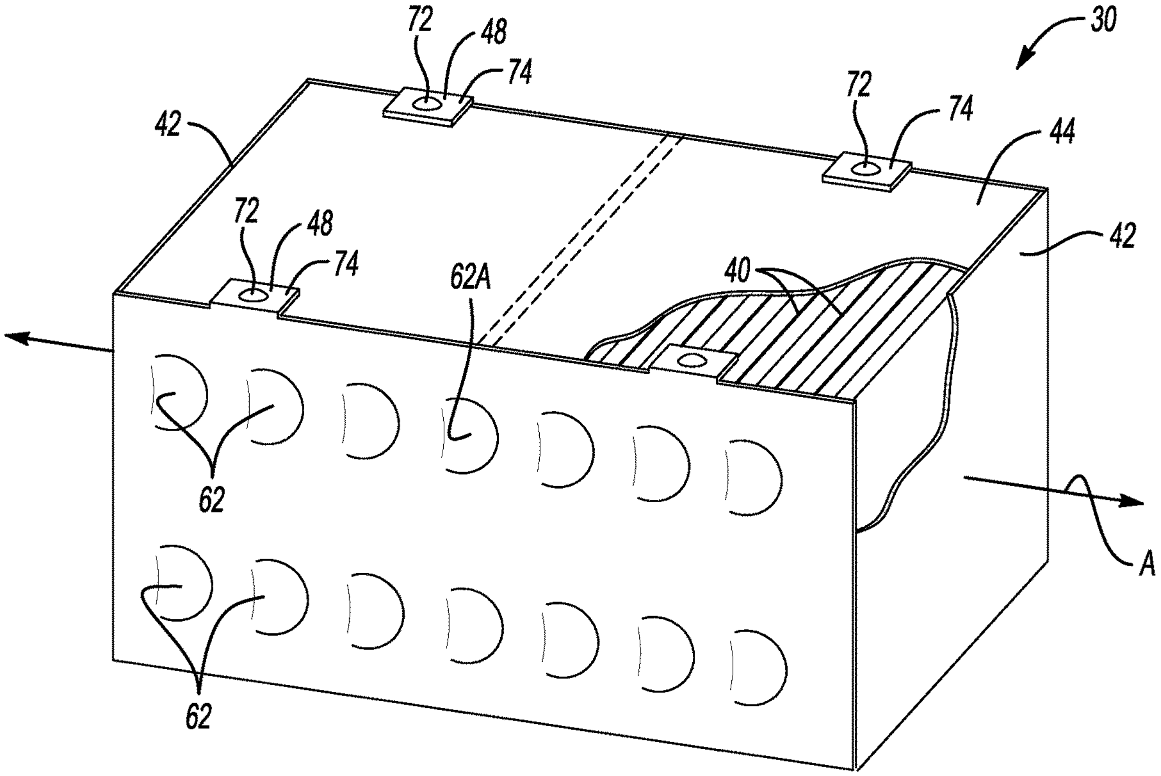
FIG. 3 illustrates a perspective view of a battery array from the battery pack of FIG. 2 when no battery cells are venting.
Figure 4:
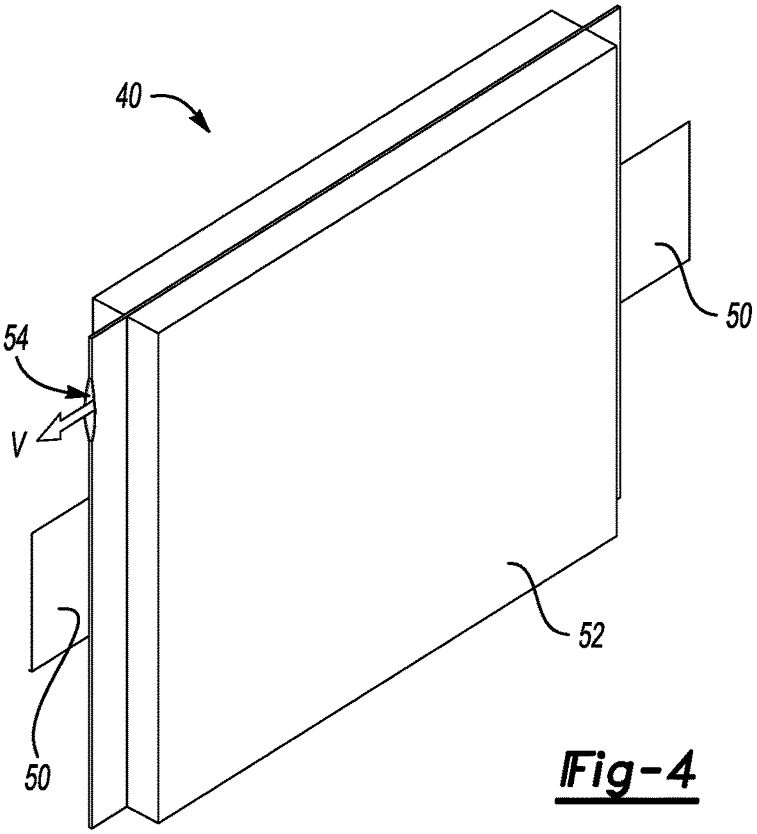
FIG. 4 illustrates a perspective view of an example battery cell from the battery pack of FIG. 3 when the battery cell is venting.

Referring now to FIGS. 2-4 with continuing reference to FIG. 1, the battery pack 12 includes an enclosure 20 that houses, among other things, a plurality of battery arrays 30. The example enclosure 20 includes a tray 32 and a lid 34. The example enclosure 20 holds eight individual battery arrays 30.

In the exemplary embodiment, each of the battery arrays 30 includes a plurality of battery cells 40, endplates 42, a top plate 44, and a pair of thermal barriers 48. The battery cells 40 of each of the battery arrays 30 are disposed along a respective cell stack axis A. Within each of the battery arrays 30, the battery cells 40 are compressed along the cell stack axis A between the endplates 42.

The top plate 44 extends over the vertically upper surfaces of the battery cells 40. Vertical and horizontal, for purposes of this disclosure are with reference to ground and a general orientation of the vehicle 10 during operation.

In the exemplary embodiment, the thermal barriers 48 are disposed alongside opposing outboard sides of the battery cells 40. In other examples, the thermal barriers 48 could be disposed alongside other surfaces of the battery array 30, such as along an outboard side of the battery array 30.

The thermal barriers 48, in this example, can include a plurality of woven fibers. The thermal barriers 48 can be mica-based. In another example, the thermal barrier 48 instead or additionally includes nonwoven fibers. The thermal barriers 48 are a thermal insulators. The thermal barriers 48 can be considered a thermal blanket.

In an embodiment, the battery cells 40 are lithium-ion pouch cells. However, battery cells having other geometries (cylindrical, prismatic, etc.), other chemistries (nickel metal hydride, lead acid, etc.), or both could be alternatively utilized within the scope of this disclosure.

Each of the example battery cells 40 includes a pair of tab terminals 50 extending from case 52. Within a given one of the battery arrays 30, the individual battery cells 40 can be electrically connected together. To provide these electrical connections, the tab terminals 50 of the battery cells 40 can be connected to the tab terminals 50 of other battery cells 40, to a busbar of the battery array 30, or both.

From time to time, pressure and temperature within one of the battery cells 40 can increase and rupture the case 52 to provide an opening 54 in the case 52. The battery cell 40 then expel vent byproducts V through the opening 54. From the opening 54, the vent byproducts V flow out from the cell stack axis A and against the thermal barrier 48. Although a single one of the battery cells 40 is shown as venting, more than one of the battery cells 40 can be venting at the same time.

A build-up of vent byproducts V between the thermal barrier 48 and other battery cells 40 that are not venting can raise thermal energy levels in those other battery cells 40, which can lead to the venting event cascading to those other battery cells 40.

Figure 5:
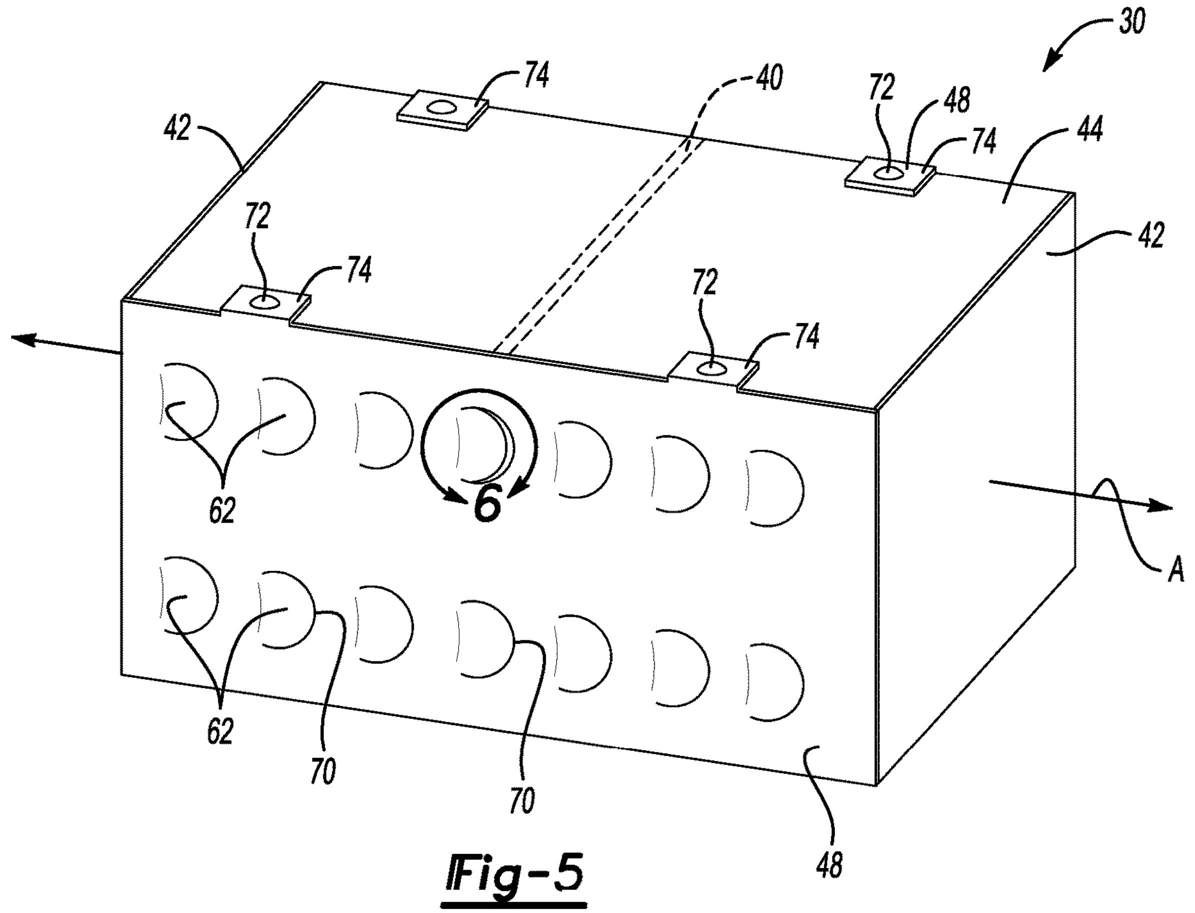
FIG. 5 illustrates the perspective view of the battery array of FIG. 3 when the battery cell of FIG. 4 is venting.
Figure 6:
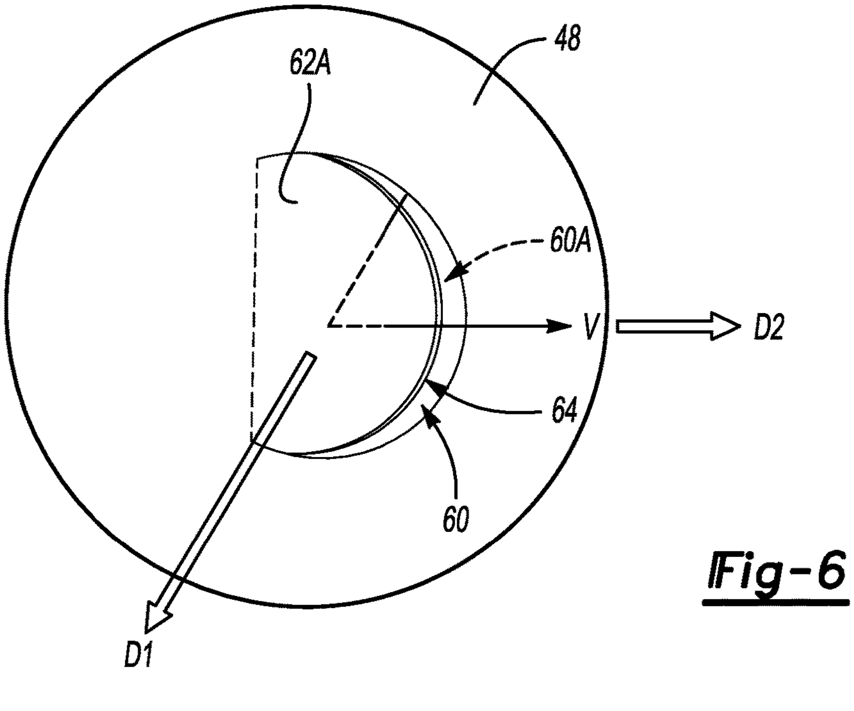
FIG. 6 illustrates a close-up view of an area of FIG. 5.
Figure 7:
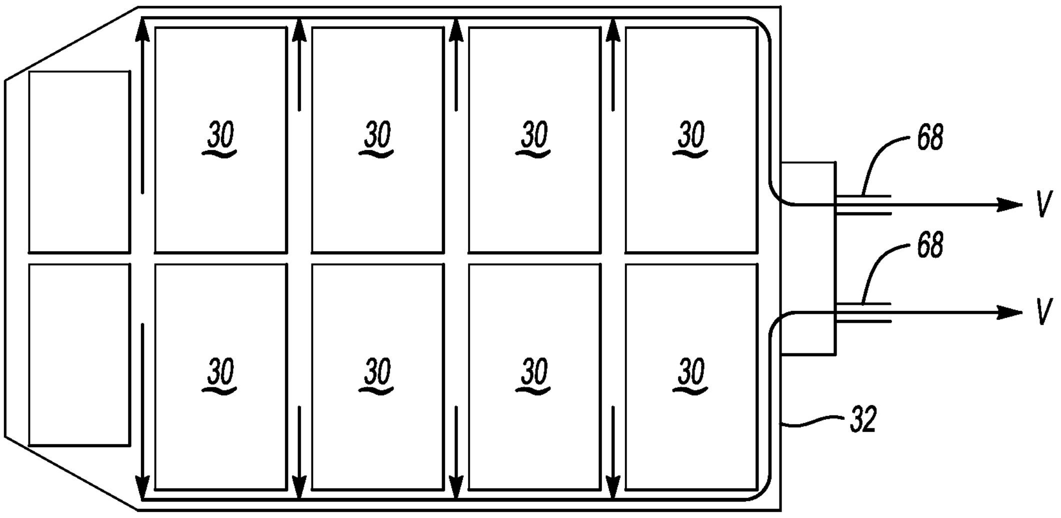
FIG. 7 illustrates a top view of the battery pack of FIG. 2 with an enclosure lid removed to show a possible vent path within the enclosure.

With reference now to FIGS. 5-7 and continuing reference to FIGS. 1-4, the thermal barrier 48 is thus equipped with a plurality of apertures 60 that are, when no cells 40 are venting, covered by respective deflector hood 62. When vent byproducts V move against an underside 64 of one of the deflector hoods 62, the deflector hood 62 moves to permit flow through the aperture 60. The undersides 64 of each deflector hood 62 faces the battery cells 40.

In this example, when a flow of the vent byproducts V moves against the underside 64 of the deflector hood 62, the deflector hood 62 can be moved from the closed position to an open position. Each deflector hood 62 is thus configured to move from a closed position to an open position in response to a flow of vent byproducts against the deflector hood 62.

With reference to the deflector hood 62A, the deflector hood 62A in the closed position covers the aperture 60A in the thermal barrier 48 when the deflector hood 62A is in the closed position (FIG. 3). The deflector hood 62A in the open position-here a fully open position shown in FIGS. 5 and 6—reveals some of the aperture 60A to permit some flow of the vent byproducts through the aperture 60A, but still partially covers the aperture 60A. In this position, the deflector hood 62A is hood-shaped.

Since the deflector hood 62A partially covers the aperture 60A in the fully-open position, the flow of the vent byproducts V through the aperture 60A contacts the underside 64 of the deflector hood 62A. The contact redirects the vent byproducts V. In particular, the vent byproducts V initially move through the aperture 60A in a first direction D1. After contacting the underside 64 of the deflector hood 62A, the vent byproducts V are redirected to flow in a second direction D2 that is different than the first direction D1.

Vent byproducts V moving in the second direction D2 are moving, in this example, toward the outboard regions of the battery pack 12 and away from other battery arrays 30. After reaching a wall of the tray 32, the vent byproducts V have cooled a bit. The vent byproducts V can then flow within the battery pack 12 to one or more enclosure vents 68, which release the vent byproducts V to an ambient area around the battery pack 12. The deflector hoods 62A can be designed to direct vent byproducts V other directions. In some examples, the vent byproducts V could be directed inward toward a center of the battery pack 12.

In this example, the thermal barrier 48 includes a plurality of cuts 70 that establish the deflector hoods 62. The cuts 70 have an arc-shaped, "C"-shaped provide. The apertures 60 can be crescent-shaped. Each of the cuts 70 establish one of the deflector hoods 62. Due to the shape of the cuts 70, the deflector hoods 62 have a fish-scale shape. The thermal barrier 48 can be sliced to establish the cuts 70.

In another example, the cuts 70 are a scored region of the thermal barrier 48. The scored region can establish the deflector hoods 62 using perforations. The thermal barrier 48 can be sliced to establish the perforations. Transitioning such the deflector hood 62 from the closed position to an open position can require the vent byproducts V to ripping some of the thermal barrier 48.

The example thermal barriers 48 are secured along the outboard sides of the battery arrays 30 using push-pins 72 that extend through flaps 74 in the thermal barriers 48 to engage the top plate 44 of the respective battery array 30. In other examples, the thermal barriers 48 could instead or additionally be secured using an adhesive.

Although shown along the outboard sides, the thermal barriers 48 having the deflector hoods 62 could instead or additionally be placed in other areas. For example, the thermal barriers 48 could be placed adjacent other sides of the battery arrays 30, such as along the vertical top of the battery arrays 30 in place of the top plate 44. The thermal barriers 48 with deflector hoods 62 could be positioned along the vertical top of the battery cells 40 if the battery cells 40 are prone to opening (i.e., venting) through the vertical tops of the battery cells 40.

The thermal barriers 48 could also be disposed along the endplates 42 to block transfer of thermal energy from the battery arrays 30 on one side of the battery pack 12 to battery arrays 30 on the other side of the battery pack 12. When disposed along the endplates 42 such that the endplates 42 are sandwiched between battery cells 40 and a thermal barrier, the thermal barrier may not include the deflector hoods 62.

An example method of venting a battery pack using the example thermal barriers 48 includes positioning the thermal barrier 48 with the deflector hoods 62 adjacent to battery cells 40. Next, the method moves at least one of the deflector hoods 62 from a closed position to an open position in response to a flow of vent byproducts against the deflector hood 62, which then redirects the flow of vent byproducts. The redirecting includes redirecting the flow of vent byproducts V from moving outward away from the plurality of battery cells 40 to move along the cell stack axis A.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack assembly, comprising:

a cell stack having a plurality of battery cells;

a thermal barrier adjacent the cell stack; and a plurality of deflector hoods included within the thermal barrier, each deflector hood configured to move from a closed position covering an aperture in the thermal barrier to an open position in response to a flow of vent byproducts against the deflector hood, wherein each deflector hood, in the open position, remains attached to the thermal barrier and partially covers the aperture such that vent byproducts passing through the aperture contact an underside of the deflector hood and are redirected from a first direction to a second direction different than the first direction.

2. The battery pack assembly of claim 1, wherein each deflector hood has an underside facing the plurality of battery cells, the flow of vent byproducts contacting the underside to move the deflector hood from the closed position to the open position.

3. The battery pack assembly of claim 1, wherein the open position is a fully-open position in which the deflector hood partially covers the aperture.

4. The battery pack assembly of claim 1, wherein the thermal barrier includes a plurality of scored regions, each scored region establishing one of the deflector hoods within the plurality of deflector hoods.

5. The battery pack assembly of claim 4, wherein each scored region within the plurality of scored regions is arc-shaped.

6. The battery pack assembly of claim 1, wherein the thermal barrier includes a plurality of cuts, each cut establishing one of the deflector hoods within the plurality of deflector hoods.

7. The battery pack assembly of claim 6, wherein each cut within the plurality of cuts has a C-shaped profile.

8. The battery pack assembly of claim 1, wherein each deflector hood within the plurality of deflector hoods is hood-shaped.

9. The battery pack assembly of claim 1, wherein the thermal barrier is mica-based.

10. The battery pack assembly of claim 1, wherein the plurality of battery cells are disposed along a cell stack axis, wherein the thermal barrier is adjacent an outboard side of the cell stack, the deflector hood configured to guide flow moving away from the cell stack axis to move along the cell stack axis.

11. The battery pack assembly of claim 1, wherein the thermal barrier is secured adjacent to the cell stack using a plurality of push-pins.

12. A battery pack assembly, comprising:

a cell stack having a plurality of battery cells;

a thermal barrier adjacent the cell stack; and a plurality of deflector hoods included within the thermal barrier, each deflector hood configured to move from a closed position covering an aperture in the thermal barrier to an open position in response to a flow of vent byproducts against the deflector hood, wherein each deflector hood, in the open position, remains attached to the thermal barrier and partially covers the aperture such that vent byproducts passing through the aperture contact an underside of the deflector hood and are redirected from a first direction to a second direction different than the first direction, wherein the thermal barrier is secured adjacent to an endplate of the cell stack.

13. A battery pack assembly, comprising:

a cell stack having a plurality of battery cells disposed along a cell stack axis, each battery cell configured to expel vent byproducts in a direction transverse to the cell stack axis;

a thermal barrier adjacent an outboard side of the cell stack; and a plurality of deflector hoods within the thermal barrier, each deflector hood covering a respective aperture in a closed position and, in an open position, remaining attached to the thermal barrier and partially covering the respective aperture so that vent byproducts passing through the respective aperture contact an underside of the deflector hood and are redirected from a first direction moving away from the cell stack axis to a second direction moving along the cell stack axis.

14. The battery pack assembly of claim 13, wherein each aperture is crescent-shaped and each deflector hood has a fish-scale shape.

15. The battery pack assembly of claim 13, wherein the plurality of deflector hoods are established by a respective plurality of C-shaped cuts in the thermal barrier.

16. The battery pack assembly of claim 13, wherein the battery cells are pouch cells each having a case configured to rupture and provide the vent byproducts.

17. The battery pack assembly of claim 13, wherein the thermal barrier comprises woven mica-based fibers.

18. The battery pack assembly of claim 13, further comprising a top plate extending over the cell stack, wherein the thermal barrier is secured to the top plate by a plurality of push-pins extending through respective flaps of the thermal barrier.

19. The battery pack assembly of claim 13, comprising a pair of the thermal barriers disposed along opposing outboard sides of the cell stack.

* * * * *